(12) United States Patent
Heidrich et al.

(10) Patent No.: US 8,531,353 B2
(45) Date of Patent: Sep. 10, 2013

(54) MULTIPLE MODULATOR DISPLAYS AND RELATED METHODS

(75) Inventors: Wolfgang Heidrich, Vancouver (CA); Matthew Trentacoste, Vancouver (CA); Gregory J. Ward, Albany, CA (US); Helge Seetzen, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 502 days.

(21) Appl. No.: 12/524,687

(22) PCT Filed: Jan. 31, 2007

(86) PCT No.: PCT/US2007/002788
§ 371 (c)(1),
(2), (4) Date: Sep. 24, 2009

(87) PCT Pub. No.: WO2008/094153
PCT Pub. Date: Aug. 7, 2008

(65) Prior Publication Data
US 2010/0091045 A1  Apr. 15, 2010

(51) Int. Cl.
*G09G 5/00* (2006.01)
(52) U.S. Cl.
USPC .................................. 345/4; 345/6
(58) Field of Classification Search
USPC ........................................ 345/4–6
See application file for complete search history.

(56) References Cited

U.S. PATENT DOCUMENTS

| 6,381,372 | B1 | 4/2002 | Loce | |
|---|---|---|---|---|
| 2003/0090455 | A1 | 5/2003 | Daly | |
| 2005/0157366 | A1* | 7/2005 | Asahi et al. | 359/238 |
| 2009/0040171 | A1 | 2/2009 | Ishizumi et al. | |

FOREIGN PATENT DOCUMENTS

| EP | 1705636 A1 | 9/2006 |
|---|---|---|
| EP | 1927974 A2 | 6/2008 |
| JP | 8334742 | 12/1996 |
| JP | 2002099250 A | 4/2002 |
| JP | 2005-258403 A | 9/2005 |
| JP | 2005-309338 A | 11/2005 |
| WO | 02069030 A2 | 9/2002 |
| WO | 03077013 A2 | 9/2003 |
| WO | 2005101309 A1 | 10/2005 |
| WO | 2006010244 A1 | 2/2006 |
| WO | 2007007472 A1 | 1/2007 |

OTHER PUBLICATIONS

Seetzen, H. et al., "A High Dynamic Range Display Using Low and High Resolution Modulators", SID 03 DIGST, 2003, pp. 1450-1453.

\* cited by examiner

*Primary Examiner* — Kevin M Nguyen
*Assistant Examiner* — Cory Almeida

(57) ABSTRACT

A dual modulator display has a first array of pixels that illuminates a second array of pixels with a pattern of light. The second array of pixels modulates the pattern of light to yield an image. A method for determining control values for pixels of the first array of pixels begins with an initial set of control values and refines the control values. The control values may be refined one at a time. Images may be displayed in real time.

22 Claims, 7 Drawing Sheets

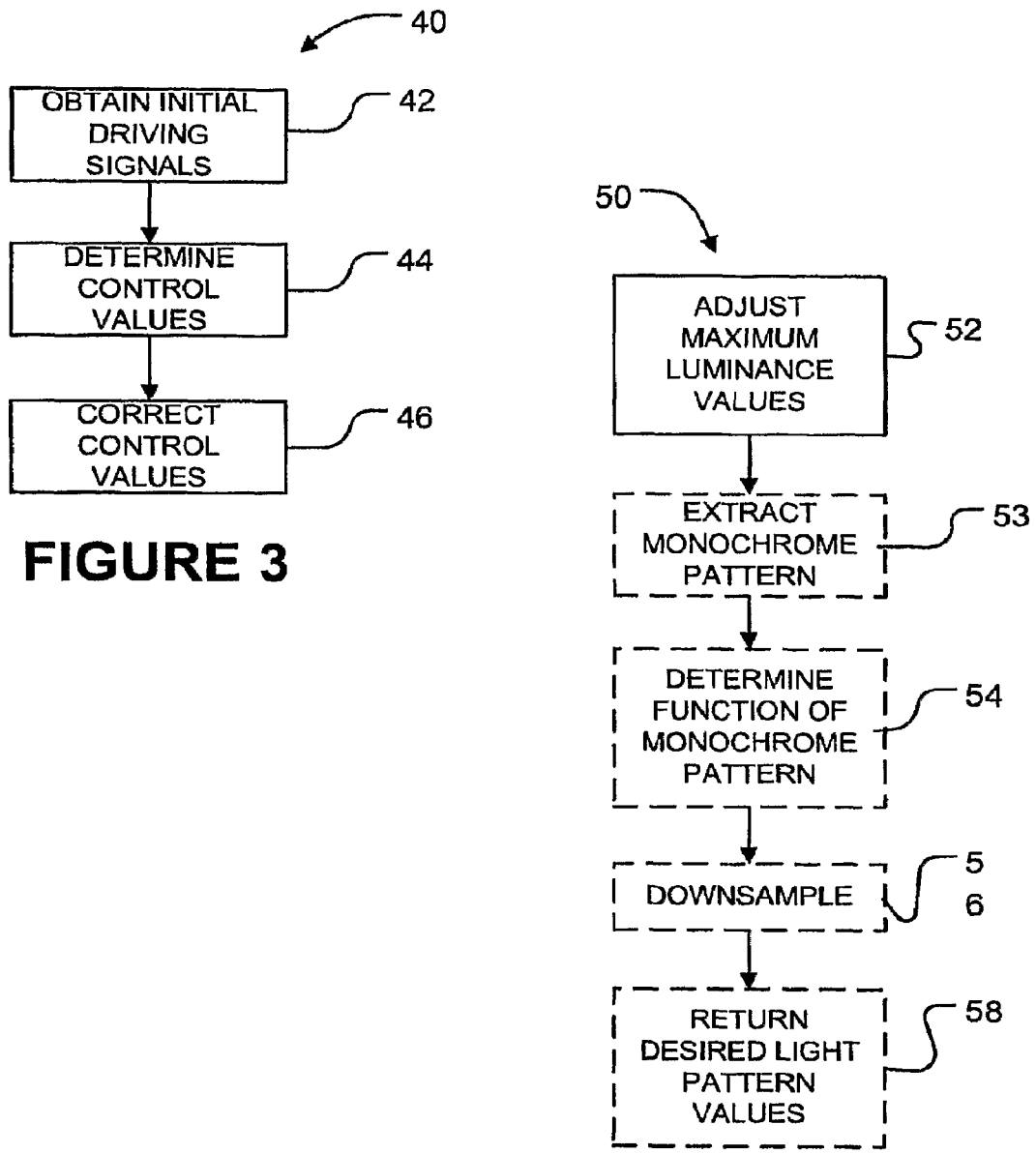

US 8,531,353 B2

MULTIPLE MODULATOR DISPLAYS AND RELATED METHODS

TECHNICAL FIELD

The invention relates to electronic displays such as computer monitors, televisions, data projectors and the like. The invention relates more specifically to such displays in which light from a first array of pixels is modulated by a second array of pixels to yield an image.

BACKGROUND

Dual modulator displays have a first array of pixels that generates a controllable pattern of light at a second array of pixels. Examples of dual modulator displays are described in WO02/069030 (PCT/CA2002/000255) and WO03/077013 (PCT/CA2003/000350), both entitled HIGH DYNAMIC RANGE DISPLAY DEVICES. In some embodiments, image data specifying a desired image is supplied to a controller which operates the first array of pixels to yield a pattern of light at the second array of pixels. The pattern of light approximates the desired image. The controller operates the second array of pixels to modulate the pattern of light to yield an image that is closer to the desired image than the pattern of light. In some embodiments the first array of pixels has a lower resolution than the second array of pixels (i.e. there are more pixels in the second array of pixels than there are in the first array of pixels). The first array of pixels may comprise, for example, an array of individually-controllable light sources pixels of a spatial light modulator, or the like. The second array of pixels may comprise a reflective or transmissive spatial light modulator.

In some embodiments the first array of pixels comprises an array of light-emitting diodes (LEDs) and the second array of pixels comprises a liquid crystal display (LCD) panel.

A "dual modulator" display architecture can be suitable for use in high-end displays (some examples of high end displays are displays for viewing X-rays and other critical images; high-end cinema applications and the like). In such applications it is desirable to make the displayed image reproduce the desired image as closely as possible. In such applications, any perceptible deviation from the desired image is undesirable.

In a "perfect" dual modulator display the first set of pixels would have light outputs that are steplessly variable from zero to very bright and the second set of pixels would be steplessly controllable between transmitting zero light and passing all incident light. In the real world, the components practical for use as the first and second sets of pixels have limitations. For example, where the first or second set of pixels comprises pixels of an LCD (liquid crystal display) the pixels have a maximum transmission of less than 100%, a minimum transmission greater than 0%, and the transmission of each pixel is typically selectable from among a discrete set of values. Similarly, where the first set of pixels comprises an array of individually-controllable light sources (such as LEDs, for example) it is typical that the light sources have light outputs that can be adjusted in discrete steps up to some maximum value.

One problem is to determine how to control the first set of pixels so that the pattern of light on the second set of pixels will approximate the desired image in a way that can be corrected for by the second set of pixels to a high degree of accuracy.

SUMMARY OF THE INVENTION

One aspect of the invention provides a method for generating control values for pixels of a first array of pixels in a dual modulator display. The method comprises generating a desired light pattern and an initial set of control values from image data defining a desired image, and, refining the initial set of control values by determining for a pixel a change $\Delta d_j$ that tends to reduce a difference between the desired light pattern and a light pattern estimated to be produced in response to the set of control values at a location corresponding to the pixel.

Further aspects of the invention and features of specific embodiments of the invention are described below.

BRIEF DESCRIPTION OF THE DRAWINGS

In drawings which illustrate non-limiting embodiments of the invention:

FIGS. 3 and 3A are flow charts illustrating methods according to the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The inventors have determined that there is a need for:
dual modulator displays;
controllers for dual modulator displays;
methods for operating dual modulator displays;
methods for generating control values for controlling pixels of dual modulator displays; and
program products containing software for operating dual modulator displays and generating control values for the pixels of dual modulator displays;
that display images while reducing loss of image information notwithstanding the constraints imposed by the capabilities of the first and second arrays of pixels.

Figure 1:
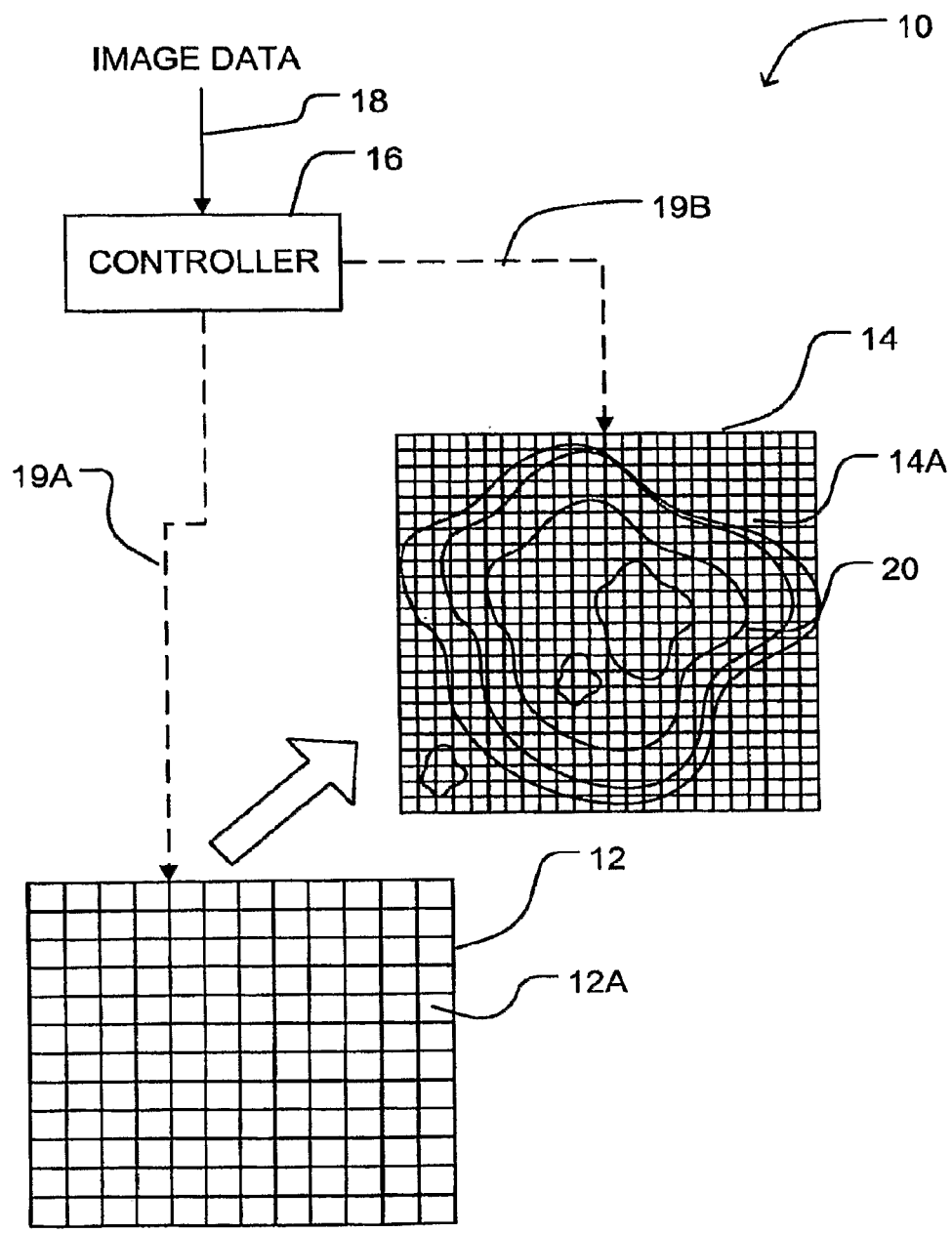
FIG. 1 is a schematic diagram of a dual modulator display.

For example, consider the case illustrated in FIG. 1. A display 10 comprises a first array 12 of pixels 12A and a second array 14 of pixels 14A. A controller 16 receives image data 18 and generates control signals 19A and 19B to control the pixels of the first and second arrays of pixels respectively. First array 12 may, for example, comprise an array of light-emitting diodes (LEDs) or other light sources. Second array 14 may, for example, comprise an LCD panel.

Controller 16 derives signals 19A and 19B from image data. Signals 19A may comprise, for example, a set of control values d for pixels 12A of first array 12. Signals 19B may comprise, for example, a set of control values p for pixels 14A of second array 14.

In response to control signals 19A from controller 16, first array 12 emits light. The light emitted by pixels 12A of first array 12 yields a pattern 20 of light on second array 14. Pattern 20 is an approximation of a desired image specified by image data 18. Since first array 12 has significantly fewer pixels than second array 14, aspects of the desired image that have higher spatial frequencies will be represented primarily by control signals 19B. Pattern 20 will track aspects of the desired image that have relatively low spatial frequencies.

The characteristics of pattern 20 depend on the amounts of light emitted by pixels 12A of first array 12, as well as the point spread functions of pixels 12A. Optical elements (not shown) such as diffusers, lenses, collimators, etc. may be provided between first and second arrays 12 and 14. The effect of any such optical elements on pattern 20 may be taken into account by the point spread functions of pixels 12A.

Pattern 20 can be characterized by an intensity value $B_i$ at each pixel 14A of second array 14 (where i is an index that identifies a specific pixel 14A). The way in which control signals 19A are derived from the image data 18 can affect the quality of the image produced by display 10. If control signals 19A result in a "good" pattern 20 then second modulator 14 can modulate the light in pattern 20 to reproduce the desired image very accurately. On the other hand, if control signals 19A produce a pattern 20 that is sub-optimal then it may not be possible to determine control signals 19B that will cause second modulator 14 to modulate pattern 20 in a way that matches the desired image without perceptible artifacts.

Figure 2A:
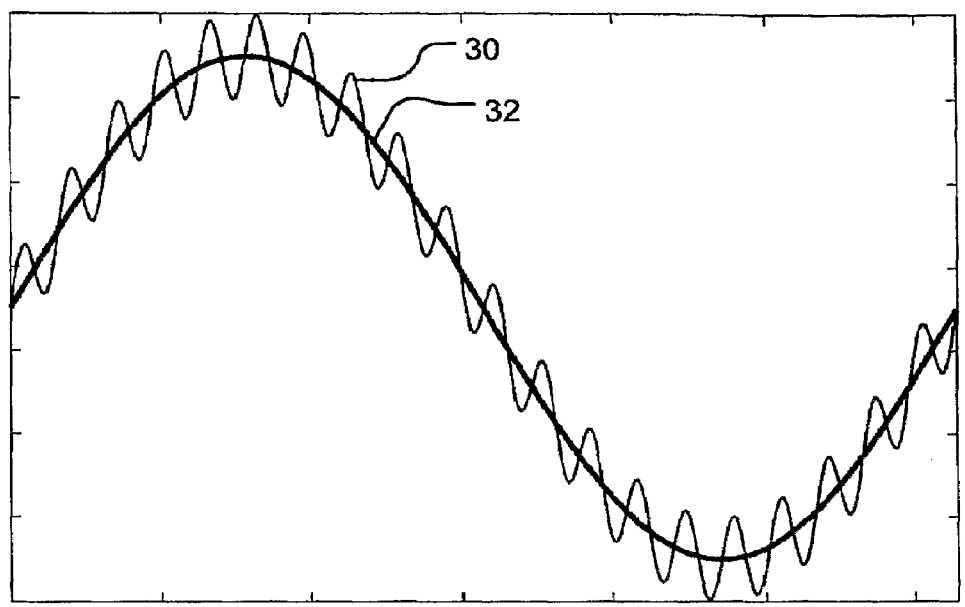
FIG. 2A is a graph including curves showing a desired image and a light pattern generated by a first pixel array.
Figure 2B:
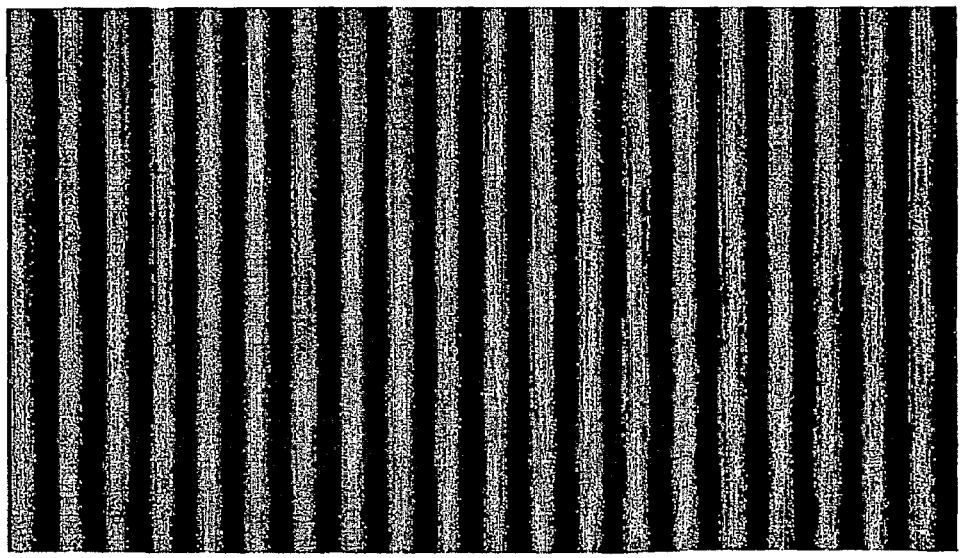
FIG. 2B is a high-spatial-frequency component generated by a second pixel array for the image from FIG. 2A.

Consider, for example, the case where, in an area of the desired image, the desired image depicts stripes having a spatial frequency too high to be reproduced in pattern 20. The stripes are superposed on a background light intensity that varies at a lower spatial frequency. Curve 30 of FIG. 2A shows a variation in intensity of the desired image in a direction across the stripes. Curve 32 shows a variation in intensity of the light in an example pattern 20. If the light in pattern 20 has an intensity that varies in a way which is a good match to the low spatial frequency component of curve 30 (as indicated by curve 32) then second array 14 can be set to generate the high-spatial-frequency components of the desired image, as shown in FIG. 2B, so that the resulting image faithfully reproduces the desired image.

Figure 2C:
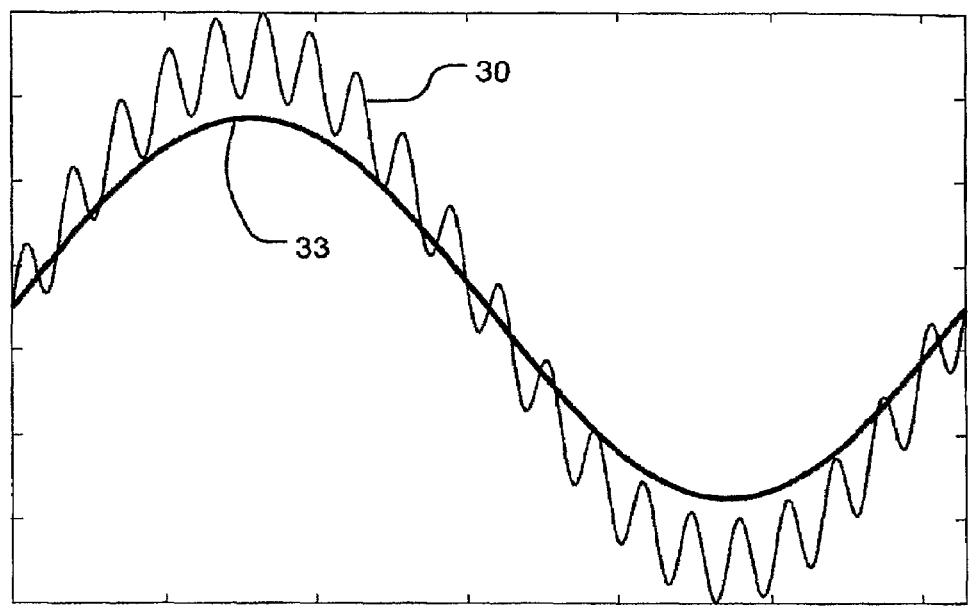
FIG. 2C is another graph including curves showing a desired image and a light pattern generated by a first pixel array which is a sub-optimum match to the desired image.
Figure 2D:
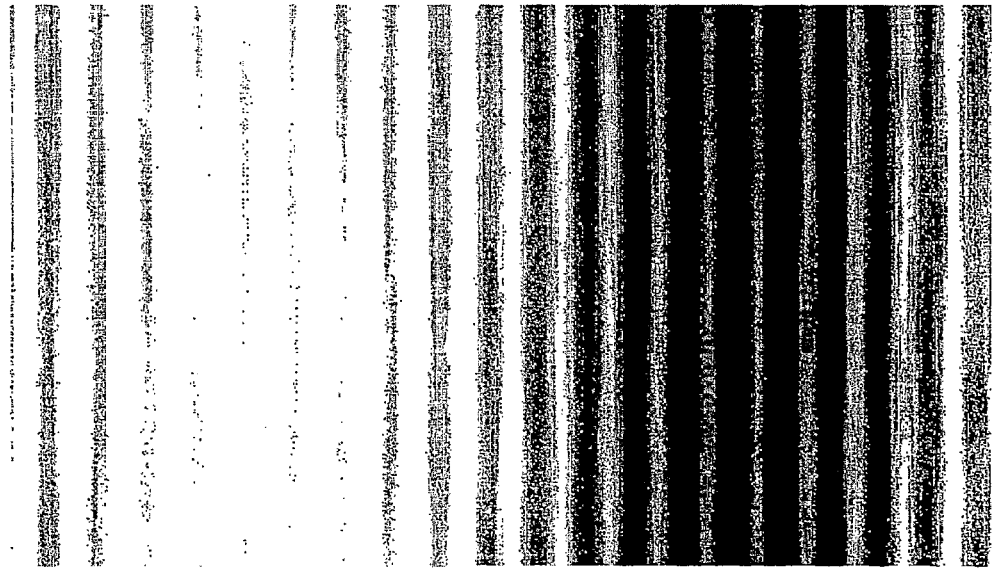
FIG. 2D is a high-spatial-frequency component generated by a second pixel array for the image from FIG. 2C.

On the other hand, in some situations the light in pattern 20 has an intensity that varies in a way which is not such a good match to the low spatial frequency component of curve 30. This may occur, for example, in a situation where the point spread function of pixels 12A of first array 12 is such that the low spatial frequency of pattern 20 is lower than the low spatial frequency component of the desired image. Curve 33 in FIG. 2C shows a variation in intensity of the light in another example pattern 20, which illustrates such a mismatch between the low spatial frequency components of curve 30 and pattern 20. In such situations, second array 14 is unable to accurately generate the high-spatial-frequency components of the desired image, as shown in FIG. 2D, so that the resulting image may fail to faithfully reproduce the desired image. Losses of high-spatial-frequency information can occur as a result of quantization of the signals controlling pixels 14A. For example, in cases where $B_i$ is significantly greater than the desired light output of pixel 14A, the value $p_i$ for the pixel 14A may be rounded to zero. In cases where $B_i$ is equal to or less than the desired light output of pixel 14A, the value $p_i$ for the pixel 14A may be clamped at a maximum value. In either case, the resulting image does not contain all of the information in image data 18.

It can be seen that obtaining the best possible image quality from a dual modulator display of the type described herein (in which the pattern of light from the first array of pixels does not contain the highest spatial frequency components of the image data) can require some optimization of the light pattern 20.

FIG. 3 illustrates steps in a method 40 for obtaining signals 19A and 19B from image data 18 according to an embodiment of the invention. Image data 18 comprises a set $\bar{I}$ of values $\bar{I}_i$. In some embodiments, the values are color values. In such embodiments, the values are most conveniently expressed in a color space that has the same chromaticity, white point, and primaries as a display 10 on which the image will be displayed.

Block 42 derives an initial set of control signals 19A for pixels 12A of first array 12. In an example embodiment, block 42 involves a process 50 as shown in FIG. 3A. Process 50 derives a target light pattern $\bar{B}$ from image data 18. The target light pattern $\bar{B}$ may comprise values $\bar{B}_i$ corresponding to each pixel 14A of second pixel array 14. The values may be expressed in photometric units, for example. In some embodiments, the values $\bar{B}_i$ are monochromatic values in photometric units, such as luminance. Block 52 may comprise clamping luminance values so that they do not fall outside of the range displayable by a display 10 on which the image will be displayed.

If image data 18 specifies a color image then block 53 may comprise extracting a monochrome (single channel luminance) representation of image data 18. This may be achieved by taking the maximum of the three color channels (e.g. red, green and blue) for each pixel of the second array of pixels.

Block 54 determines values for $\bar{B}_i$ by computing a function of the monochrome representation of image data 18. In some embodiments, the function comprises determining a fractional power of the value of the corresponding pixel in the monochrome representation of image data 18. The power is chosen so as to allocate the dynamic range between the first and second arrays. In some embodiments, block 54 comprises taking the square roots (the ½ power) of the values in the monochrome representation of image data 18. The optimum division of the dynamic range between the first and second arrays of pixels will depend on the ratio of dynamic ranges between the first and second arrays. In some dual modulator displays such as the model DR 37 P display available from Brightside Technologies Inc. of Vancouver, Canada the ratio of dynamic ranges between the first and second arrays is about 1:1 and a power of approximately ½ is a good basis for obtaining signals 19A.

A single light source that can be turned off entirely could be considered to have an infinite dynamic range. However, the dynamic range of a light source within any collection of such light sources that have overlapping point spread functions is determined by the point spread functions for the light sources and the light outputs of neighboring light sources.

Maintaining pixel values on the first and second pixel arrays to be of the same order of magnitude is preferable, other factors being equal, to a case in which one of the arrays is given large pixel values while the other array is given very small values because quantization artifacts are relatively large for small values. Also, if different combinations of values are used for adjacent pixels of the same intensity, the imperfect alignment present in real hardware systems could cause significant artifacts.

For purposes of calculation, it is convenient to express values for $\overline{B}$ and $\overline{I}$ in the range [0, 1]. Converting to this representation can be done by normalizing the image data. In block 54 the appropriate function of the normalized image data can be computed. The result can then be scaled to provide values for $\overline{B}$ in any desired units.

In the case where first array 12 has n pixels 12A and second array 14 has m pixels 14A with m>n then the problem of determining values for pixels 12A of array 12 which will result in the desired pattern 20 can be expressed as an m×n system of equations. In cases where the first array 12 has a low spatial frequency (i.e., if the point spread function of first array 12 has no high spatial frequency components) it is expected that pattern 20 should also have a low spatial frequency. In such cases computation can be reduced without introducing significant artifacts by downsampling the values for $\overline{B}$ to a lower resolution (it is convenient to make the lower resolution the same as that of first array 12). The resulting problem can be expressed as an n×n system of equations. Thus, the values for $\overline{B}$ may comprise a set of n values $\overline{B}_i$, with a single value $\overline{B}_i$ for each group of pixels 14A of second array 14 closest to a corresponding pixel 12A of first array 12.

In block 56 the resulting data is downsampled to a resolution which may be the same as that of first array 12. Downsampling may be implemented in a range of ways. For example:
- downsampling may be implemented in software by any suitably filtered resize function.
- downsampling may be implemented in a logic circuit, such as a suitably-configured field progammable gate array (FPGA) as an average of pixel values in neighbourhoods around positions corresponding to positions of pixels in the first array of pixels.
- downsampling may be implemented in a graphics processor by recursively taking block averages of pixel values.

Block 58 returns the values of $\overline{B}$ which specify the desired light pattern 20 (at the resolution of first array 12).

Method 40 continues in block 44 to determine control values for the pixels of first array 12 that will result in a light pattern 20 having values close to or the same as the values $\overline{B}$ returned by block 58. This can be achieved by solving the minimization problem:

$$\min_{d} \|Wd - \overline{B}\| \quad (1)$$

where d is the set of control values for pixels 12A, and W is the convolution of the point-spread functions for pixels 12A with Dirac delta functions at the position of the pixels 12A.

Computation can be saved by considering the pixels of first array 12 in neighborhoods that are smaller than array 12 instead of solving for all pixels of first array 12 at once. This can be done because, in typical dual modulator displays, a pixel.

12A of first array 12 does not contribute much light at pixels 14A of second array 14 that are at coordinates distant from the pixel 12A.

Also, the properties of the human visual system and the dynamic range of second pixel array 14 constrain which pixels of first array 12 can be adjusted to obtain a desired amount of light at a pixel 14A of second pixel array 14. The human visual system cannot detect changes in the luminance of a less-bright area that is very close to a brighter area. This effect is known as "veiling glare". Veiling glare occurs in part because of light scattering in the eye.

Figure 4:
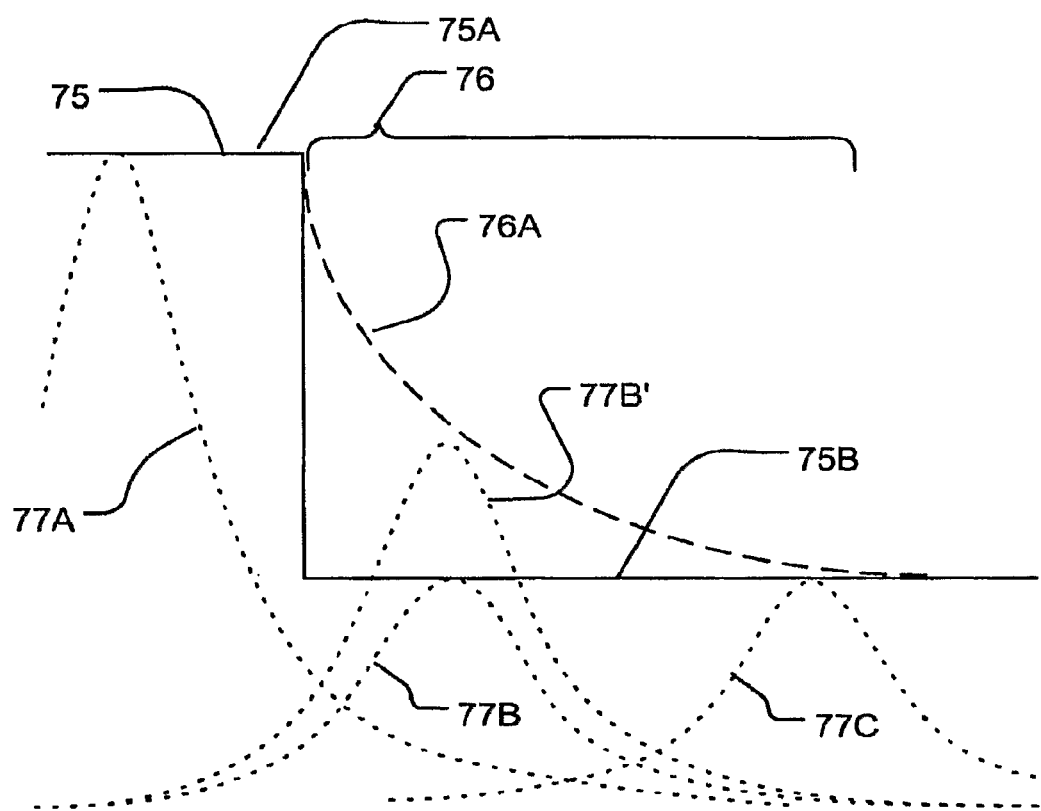
FIG. 4 is a schematic diagram illustrating the effect of veiling glare.

FIG. 4 illustrates veiling glare. A desired image is indicated by line 75. Image 75 has a bright area 75A adjacent to a dimmer area 75B. Light emitted by three pixels 12A is indicated by curves 77A, 77B and 77C. Veiling glare caused by bright area 75A affects an area 76. Within area 76 the human eye cannot distinguish differences in luminance that fall below the level 76A (which falls off with distance from bright area 75A). Outside of area 76, increasing the intensity of first array 12 beyond a locally-desired value would be detected. Pixels of first array 12 within area 76 can have increased intensities without perceptibly altering the image. For example, the light output 77B could be boosted to the value indicated by 77B' without visibly affecting the resulting image (because the peak intensity of 77B' is still below curve 76A.

While the weighting matrix W (see Equation (1)) is dense, the number of pixels 12A that can be freely altered to control the amount of light at a given pixel 14A of second pixel array 14 is quite limited. The resulting matrix of control values d is a relatively sparse, banded matrix which can be solved exactly or approximately in any suitable manner to obtain control signal values $d_j$ for pixels 12A (j is an index that identifies specific pixels 12A).

In one embodiment, $d_j$ is given by:

$$d_j = \frac{\overline{B}_j - \sum_{i}^{N(\delta_j)} w_{ji} \overline{B}_i}{w_{jj}} \quad (2)$$

where: $\overline{B}_j$ is the value of the target light pattern at pixels 14A of second array 14 in an area corresponding to the pixel 12A identified by index j (the jth pixel); $\overline{B}_i$ is the value of the target light pattern at pixels 14A of second array 14 in an area corresponding to the pixel 12A identified by index i (the ith pixel); $N(\delta_j)$ includes pixels 12A in a neighborhood of the jth pixel; $w_{jj}$ is the value for the point spread function for the jth pixel at pixels 14A in the area corresponding to the jth pixel; $w_{ji}$ is the value for the point spread function for the ith pixel at pixels 14A in the area corresponding to the jth pixel.

The light pattern 20 that would result from control signals obtained as described above may not be optimal. The actual light pattern is characterized by values B corresponding to pixels 14A. In general, B≠$\overline{B}$. Typically, image quality can be improved by fine tuning the values for $d_j$ to yield a light pattern that better approximates the optimum light pattern. Image quality can also be improved by fine tuning the values for $d_j$ to permit more of the bit-depth of second array 14 to be applied to representing higher-spatial frequency details and color. Corrected control values are determined in block 46 of method 40.

Assuming that the initial value for $\overline{B}$ obtained in block 42 is reasonably close to the optimum value, then only small changes to the values of d should be required for optimization. Such changes are referred to herein as $\Delta d_j$. These changes can be determined by applying a "greedy" algorithm which treats pixels 12A one at a time. The algorithm attempts to reduce the difference between B and $\overline{B}$ at locations corresponding to pixels 12A.

In some embodiments, $\Delta d_j$ for the jth pixel of first array 12 may be determined such that when the jth pixel is provided with a control value of $d_j+\Delta d_j$, pixels 14A of second array 14 in an area corresponding to the jth pixel may be provided with control values p which are not subjected to rounding or clamping. This permits second array 14 to faithfully reproduce high frequency spatial components of the desired image without losses of information due to quantization of signals 19B.

In one embodiment, the algorithm comprises determining a value for $\Delta d_j$ that satisfies:

$$\frac{\bar{I} - \Delta d_j W_j}{Wd} = \alpha \qquad (3)$$

where α is a constant (which may be identified with a desired average value for control signals of second pixel array 14); $\bar{I}$, W and d are as defined above; and $W_j$ is the convolution of the point spread function for the pixel 12A currently being processed with a Dirac delta function at the location of that pixel 12A.

If B is substituted for Wd in Equation (3) then the problem can be expressed as finding a solution to:

$$\|\bar{I} - \Delta d_j W_j - \alpha B^{(j)}\| = 0 \qquad (5)$$

where $B^{(j)}$ is the set of values that characterize light pattern 20 (including the effect of any changes $\Delta d_j$ for previously-treated pixels 12A).

Equation (4) can be represented in terms of the coordinates (x,y) of pixels 12A to yield:

$$\sum_{x,y} \left( \bar{I}(x, y) - \Delta d_j S_j(x, y) - \alpha B^{(j)}_{(x,y)} \right)^2 M_{j,(x,y)} = 0 \qquad (6)$$

where $S_j(x,y)$ is a texture splat for the point spread image of the $j^{th}$ pixel 12A which is at location (x,y); $M_{j(x,y)}$ is a masking function which has a value 1 in a region surrounding the location of the pixel 12A currently under consideration and 0 otherwise (the region may, for example, be a circular region with a defined radius). Equation (5) can be solved for $\Delta d_j$ to yield:

$$\Delta d_j = \frac{\sum_{x,y} S_j \bar{I} M_j - \alpha \sum_{x,y} S_j B^{(j)} M_j}{\sum_{x,y} S_j^2 M_j} \qquad (7)$$

$B^{(j)}$ may be calculated from the values of d (which for convenient calculation are expressed in the range [0, 1]) including any $\Delta d_j$ that have been already determined. Since the point spread functions for pixels 12A will typically vary with low spatial frequencies, then calculation of $B^{(j)}$ may be implemented at a reduced resolution and subsequently upsampled. Where this is done it is desirable to ensure that pixels of the reduced resolution image are aligned with pixels 12A to avoid rounding errors.

$B^{(j)}$ may be computed in various ways. For example, in some embodiments, $B^{(j)}$ is computed as a convolution. In some such embodiments, an all black image (pixel values are all zero) having individual pixels at the locations of pixels 12A set to the respective control values ($d_j$ or $d+\Delta d_j$) as appropriate is convolved by the point spread function for pixels 12A scaled in photometric units. Such embodiments can conveniently be implemented in software.

In other embodiments, the amount of light at each pixel 14A is determined by computing the distances from that pixel 14A to contributing pixels 12A and for each such contributing pixel 12A looking up the corresponding distance in a table to obtain a value of a point spread function for the contributing pixel 12A at that pixel 14A. The value of each point spread function is modulated (e.g. multiplied) by the current control value for the pixel 12A ($d_j$ or $d+\Delta d_j$) as appropriate. Such embodiments may conveniently be implemented in logic circuits such as suitably-configured FPGAs.

Other embodiments apply a splatting approach, and draw screen-aligned quadrilaterals with textures of the applicable point spread functions into a frame buffer. Each texture is modulated by the corresponding control value ($d_j$ or $d+\Delta d_j$), as appropriate. Alpha blending may be applied to accumulate the results. Such embodiments may conveniently be implemented in graphic processor units (GPUs).

The tail of a point spread function applicable to pixels 12A can be very long (that is, light from a particular pixel 12A may reach pixels 14A that are relatively far from the pixel 12A (in terms of the coordinate spaces of the first and second pixel arrays). A compromise between accuracy and computational overhead may involve truncating the point spread functions at some reasonable distance. If this is done, it is desirable to blend the point spread function to zero in the area of the point of truncation as opposed to leaving a significant discontinuity in the point spread function.

Truncation of the point spread functions can result in the calculated intensities for pixels 14A outside the truncation distance to be smaller than they ought to be. While insignificant when compared to the peak luminance of the display, this disparity can contribute to perceivable mismatches in dark regions. Because the spatial frequency of the truncated portions of the point spread function is very low, it is possible to compensate by adding a term u to each pixel of the backlight image to represent the light not taken into account as a result of truncation. The value of u may be chosen to be a fraction (or other suitable function) of the set of control values d. A suitable value for u may be based on the difference in energy between the actual point spread function and the truncated simulation of the point spread function.

A process for solving Equation (6) may comprise operating on pixels 12A in scan-line order (i.e. starting at one corner of first pixel array 12 and working along one row of pixels at a time). For the point spread image $S_j$ corresponding to the current pixel 12A, the corresponding areas of $\bar{I}$ and B are selected and their respective elements are multiplied and then summed together to yield $\Delta d_j$. The corresponding control value $d + \Delta d_j$ is then written to the control values d and B is modified accordingly by accumulating the values $\Delta d_j S_j$ onto B.

The foregoing process may be iterated two or more times, if desired, to further refine B.

The calculations described above for refining the control values d for pixels 12A assume that the correct set of values B of the actual light pattern is known (Equation (6) involves B for example). However, in almost all cases, at the time that the computation of $\Delta d_j$ is being performed for any particular pixel 12A, $\Delta d_j$ will not yet have been computed for other pixels 12A. Even though $\Delta d_j$ is usually small (as long as a good approximation to $\bar{B}$ is obtained in block 42) the accumulated error can be significant.

If pixels 12A are processed in a known order such that an area for which $\Delta d_j$ has already been processed can be distinguished from an area for which $\Delta d_j$ has not yet been processed then it is possible to compensate for this error. For example, consider the case where pixels 12A are processed in scan line order beginning at a top left corner of first array 12. In this case, pixels 12A above and to the left of the current pixel 12A have already been updated, while pixels 12A below and to the right of the current pixel 12A have not yet been updated. Even if $\Delta d_k$ is not yet known for some k>j, the values for the desired image $\bar{I}$ and $B^{(k)}$ are known. One can assume that the control value for the kth pixel 12A will change such that the light emitted by the kth pixel 12A changes by an amount equal to the difference between $\bar{I}$ and $B^{(k)}$.

An image filter that performs the corrective measure can be added to Equation (5) to yield:

$$\sum_{x,y} (\bar{I}_{(x,y)} - \Delta d_{j,(x,y)} - \alpha B^{j}_{(x,y)})^2 M_{j,(x,y)} F_{(x,y)} = 0 \quad (7)$$

Where F is the image filter. Equation (7) can be solved for $\Delta d_j$ to yield:

$$\Delta d_j = \frac{\sum_{x,y} S_j \bar{I} M_j F - \alpha \sum_{x,y} S_j B^{(j)} M_j F}{\sum_{x,y} S_j^2 M_j F} \quad (8)$$

Equation (8) may be solved as described above, for example. All that is required is a filter function F that has a positive value for pixels 12A that have already been corrected (i.e. for which $\Delta d_j$ has been computed and added to the corresponding control value) and a negative value for pixels 12A that have not yet been corrected.

The value of a may be set to adjust the displayed image. A value of $\alpha=1$ will cause the pixels 12A to be the same intensity as $\bar{I}$, causing the operation to match the target $\bar{B}$ as best it can. Error diffusion can be performed as a second iteration to achieve the desired image. A value of $\alpha=0.5$ causes the first array 12 to be twice as bright as $\bar{I}$, resulting'in $p_{avg}=0.5$. This typically maximizes the number of bits in the control values for pixels 14A that are available for correction and minimizes artifacts arising from the quantization of control values p for second array 14.

More complicated schemes, such as choosing the value of a depending on the local neighborhood, are also possible and can be employed to provide feature-specific tone scaling of light pattern 20.

The control values d may be supplied in signals 19A to drive the corresponding pixels 12A of first array 12 of a display 10. Control values p for pixels 14A of second array 14 may be determined, for example, by:

estimating the distribution B of light in pattern 20 that will result from applying control values d to the pixels of first array 12; and,
computing values p according to:

$$p = \frac{\bar{I}}{B}$$

Figure 5:
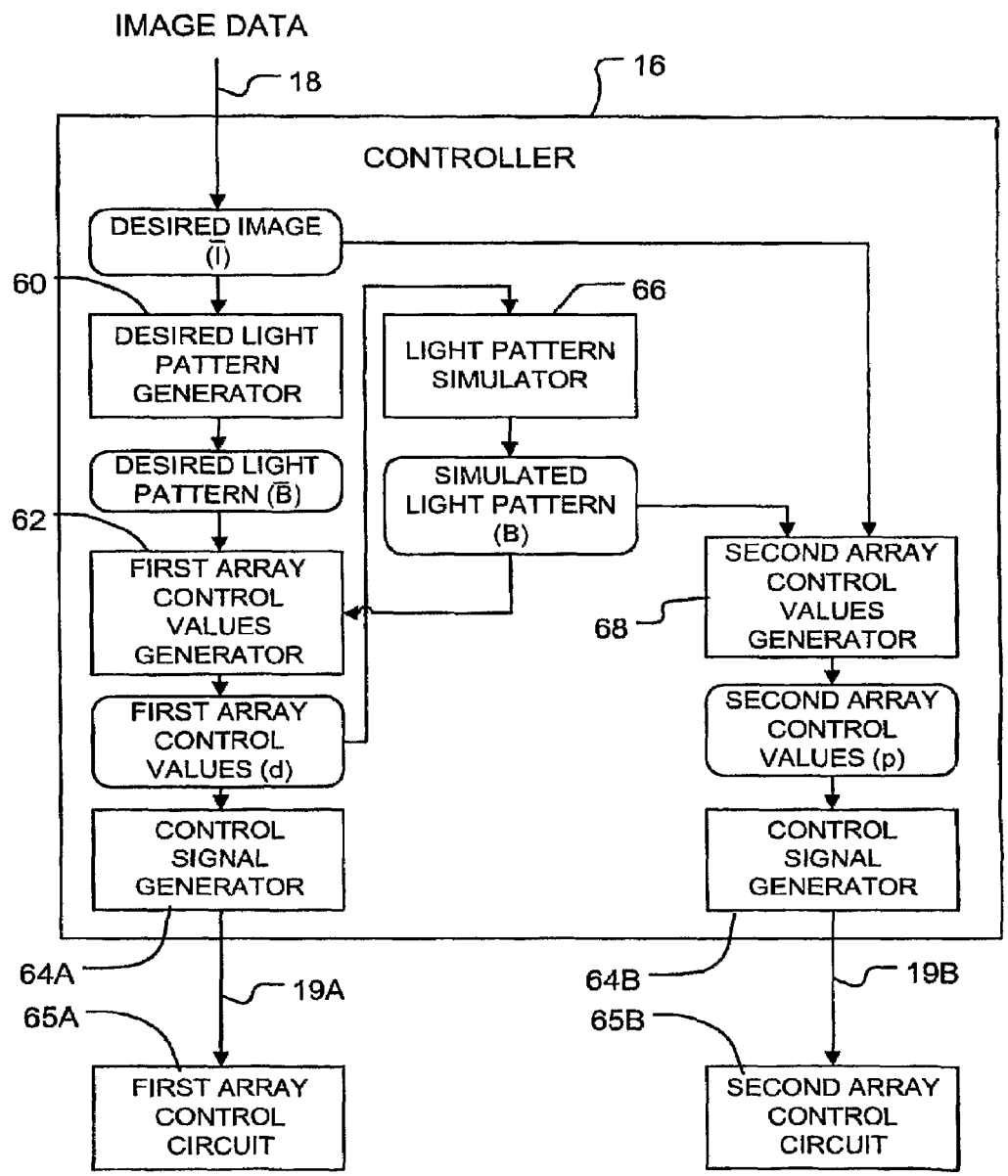
FIG. 5 is a block diagram illustrating functional components of a controller according to an embodiment of the invention.

FIG. 5 shows an example flow of data in an example controller 16 for controlling a display 10. The functional blocks in FIG. 5 may be implemented in software executed on general purpose data processors; logic circuits (for example, configured FPGAs), graphics processors or some combination thereof. Image data 18 is received at controller 16. Desired image $\bar{I}$ is extracted from image data 18. Desired light pattern generator 60 generates a desired light pattern $\bar{B}$ to be produced by first array 12. First array control values generator 62 generates control values d. First array control values generator 62 may generate control values d and adjustments $\Delta d$ according to a method as described above.

Control signal generator 64A generates control signals 19A that are supplied to first array control circuit 65A. First array control circuit 65A operates the pixels of a first array 12 according to the first array control values d. Control signals 19A may be provided directly to first array control circuit 65A or may be delivered to first array control circuit 65A after a delay. For example, signals 19A may be recorded on a medium (not shown) and played back to first array control circuit 65A at a later time.

First array control values d are also supplied to light pattern simulator 66. Light pattern simulator 66 determines a simulated light pattern B. Second array control values generator 68 generates second array control values p based upon the simulated light pattern B and desired image $\bar{I}$. Light pattern B determined by simulator 66 may also be used by first array control values generator 62 to generate $B^{(j)}$ for use in computing $\Delta d_j$ as described above, for example.

Control signal generator 64B generates control signals 19B that are supplied to second array control circuit 65B. Second array control circuit 65B operates the pixels of a second array 14 according to the second array control values p. Data 19B may be provided to second array control circuit 65B directly or after a delay as described above with reference to signal 19A.

Figure 6:
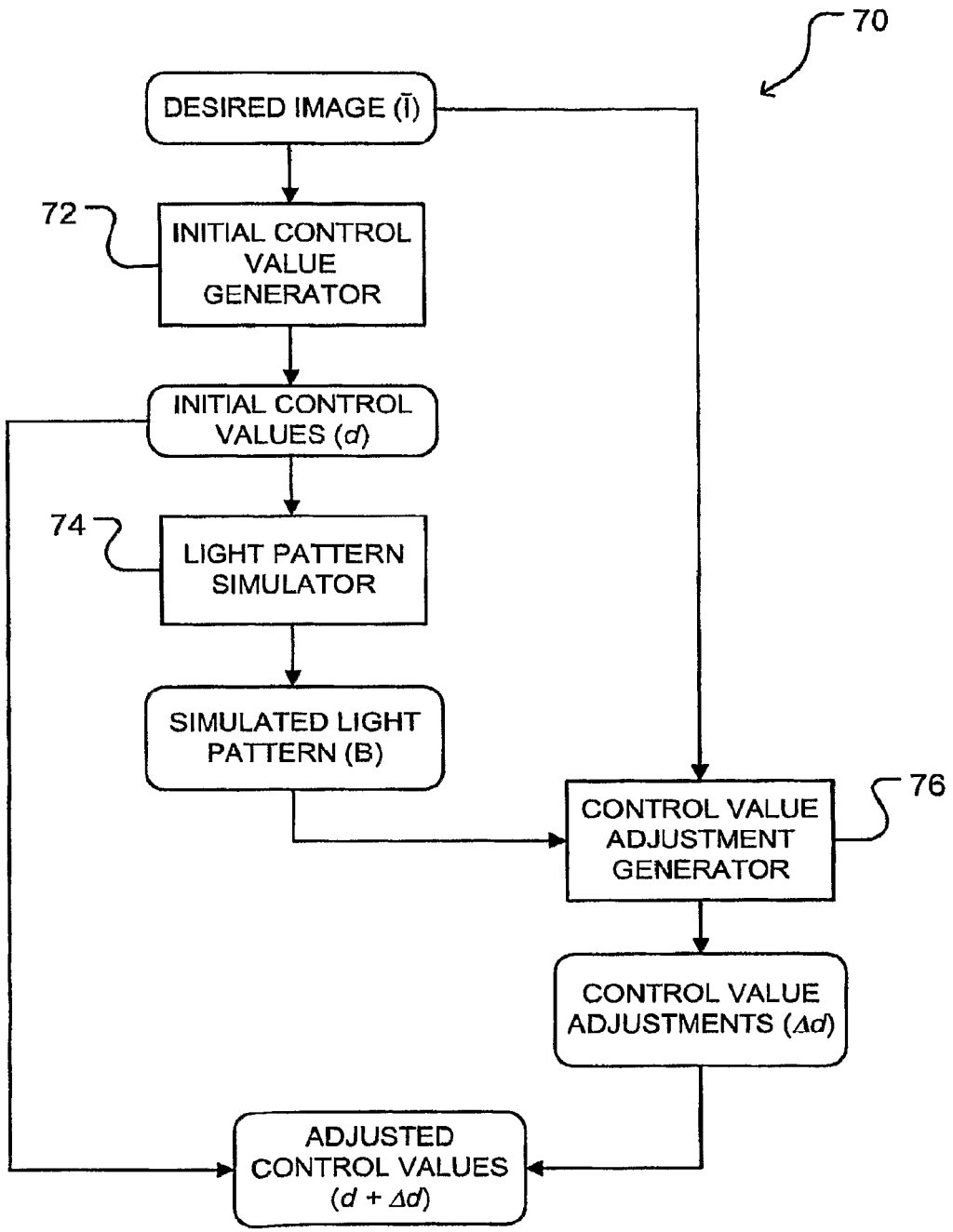
FIG. 6 is a block diagram illustrating functional components of a system for generating control signals according to an embodiment of the invention.

FIG. 6 shows an example system 70 for generating control signals for a first array of pixels in a dual modulator display. The functional blocks in FIG. 6 may be implemented in software executed on general purpose data processors; logic circuits (for example, configured FPGAs), graphics processors or some combination thereof. Desired image $\bar{I}$ is provided to an initial control values generator 72. Initial control values generator 72 generates initial control values d. Initial control values generator 72 may generate initial control values d according to a method as described above. Initial control values generator 72 may generate a desired light pattern $\bar{B}$ in the course of generating initial control values d.

Control values d are provided to a light pattern simulator 74. Light pattern simulator 74 determines a simulated light pattern B. Simulated light pattern B is provided to a control value adjustment generator 76, along with desired image $\bar{I}$. Control value adjustment generator 76 generates control signal adjustments $\Delta d$. Control value adjustment generator 76 may generate a control signal adjustment $\Delta d_j$ for each control value $d_j$ according to a method as described above. Control signal adjustments $\Delta d$ are combined with initial control values d to produce adjusted control values $d+\Delta d$.

Certain implementations of the invention comprise computer processors which execute software instructions which cause the processors to perform a method of the invention. For example, one or more processors in a display controller or one or more processors in a device that outputs a signal containing control signals 19A and 19B for use by a dual modulator display may implement the methods of FIGS. 3 and 3A by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Control signals 19A and 19B may be generated in real time in response to image data 18 (which may comprise video data, for example) or may be generated in advance.

Accordingly, the scope of the invention is to be construed in accordance with the substance defined by the following claims.

What is claimed is:

1. A method for generating control values for pixels of a first plurality of pixels in a dual modulator display in displaying a desired image specified by image data, wherein the first plurality of pixels is configured to emit light which illuminates a second plurality of pixels in response to control values applied to the first plurality of pixels and the second plurality of pixels is configured to modulate light from the first plurality of pixels, the method comprising:

from the image data defining the desired image, generating a target light pattern to be emitted by the first plurality of pixels onto the second plurality of pixels and initializing a set of control values capable of being applied to drive the first plurality of pixels to cause the first plurality of pixels to emit light to produce an approximation of the desired image;

generating an estimated light pattern that would result from applying the set of control values to drive the pixels of the first plurality of pixels; and, refining the set of control values by determining for a location corresponding to a pixel of the first plurality of pixels a change in one or more control values of the set of control values and a corresponding change in the estimated light pattern at the location corresponding to the pixel, and applying the change to the set of control values if the change reduces a difference between the estimated light pattern and the target light pattern.

2. A method according to claim 1 wherein refining the set of control values comprises performing sequentially, for a set of pixels of the first plurality of pixels:

treating the pixel by determining for the pixel the change that tends to reduce a difference between the estimated light pattern and the target light pattern at the location corresponding to the pixel.

3. A method according to claim 2 wherein treating the pixels is performed in scan line order.

4. A method according to claim 3 wherein the change is a solution to:

$$\frac{I - \Delta d_j W_j}{Wd} = \alpha$$

or a mathematical equivalent thereof for $\Delta d_j$ where I is the luminance of the desired image; Wd is the light pattern estimated to be produced in response to the set of control values; $\alpha$ is a constant; and $W_j$ is the convolution of a point spread function for the pixel of the first plurality of pixels identified by the index j with a Dirac delta function located at the location of the pixel of the first plurality of pixels.

5. A method according to claim 4 wherein $\alpha$ has a value equal to a midpoint of an optimal range of a set of control values p for pixels of a second plurality of pixels illuminated by the first plurality of pixels.

6. A method according to claim 4 wherein $\alpha$ is 0.5.

7. A method according to claim 4 wherein $\alpha$ has a value chosen based at least in part on the target light pattern in a local neighborhood of the pixel of the first plurality of pixels.

8. A method according to claim 3 wherein the change is determined by the equation:

$$\Delta d_j = \frac{\sum_{x,y} S_j I M_j - \alpha \sum_{x,y} S_j B^{(j)} M_j}{\sum_{x,y} S_j^2 M_j}$$

or a mathematical equivalent thereof for $\Delta d_j$ where $S_j$ is a texture splat for a point spread image of the pixel; I is the luminance of the desired image, $M_j$ is a masking function which has a value 1 in a region surrounding the location of the pixel and 0 otherwise; $\alpha$ is a constant; and $B^{(j)}$ is the value of the estimated light pattern at the pixel.

9. A method according to claim 2 wherein determining the change comprises applying a filter that distinguishes between pixels that have already been treated and pixels that have not yet been treated.

10. A method according to claim 9 wherein applying the filter comprises multiplying by a filter function having one sign for pixels that have already been treated and an opposite sign for pixels that have not yet been treated.

11. A method according to claim 2 comprising determining the estimated light pattern at a resolution that is lower than a resolution of the image data.

12. A method according to claim 2 comprising determining the estimated light pattern by convolving intensities of the pixels when provided with the set of control values by point spread functions of the pixels.

13. A method according to claim 12 comprising truncating a point spread function of at least one of the pixels and, for each pixel having a truncated point spread function, adding a value u to the estimated light pattern for pixels outside of a truncation boundary.

14. A method according to claim 1 wherein refining the set of control values is performed in two or more iterations.

15. A method according to claim 1 wherein the image data comprises video data and the method is performed in real time.

16. A method according to claim 1 comprising generating the target light pattern and the set of control values such that an intensity of the light pattern estimated to be produced at a pixel of a second plurality of pixels illuminated by the first plurality of pixels exceeds an intensity of a corresponding location of the desired image by an amount within a modulation range of the pixel of the second plurality of pixels.

17. A system for generating control values for pixels of a first plurality of pixels in a dual modulator display in displaying a desired image specified by image data wherein the first plurality of pixels is arranged to emit light which illuminates a second plurality of pixels in response to control values applied to the first plurality of pixels and the second plurality of pixels is arranged to modulate the light from the first plurality of pixels, the system comprising:

- an initial control values generator for generating a set of control values based on the desired image, the set of control values capable of being applied to drive the first plurality of pixels to cause the first plurality of pixels to emit light to produce an approximation of the desired image;
- a light pattern simulator for generating an estimated light pattern expected to be produced if the first plurality of pixels were controlled using the set of control values; and,
- a control value adjustment generator for generating for a location corresponding to a pixel of the first plurality of pixels an adjustment of one or more control values of the set of control values that alters the estimated light pattern so as to reduce a difference between the estimated light pattern and the target light pattern at the location corresponding to the pixel.

18. A system according to claim 17 wherein the initial control values generator generates a target light pattern prior to generating the set of control values.

19. A system according to claim 17 wherein the control value adjustment generator generates a set of adjustments for a set of pixels of the first plurality of pixels.

20. A system according to claim 19 wherein the control value adjustment generator generates the set of adjustments sequentially.

21. A system according to claim 17 wherein the adjustment is a solution to:

$$\frac{I - \Delta d_j W_j}{Wd} = \alpha$$

or a mathematical equivalent thereof for $\Delta d_j$ where I is the luminance of the desired image; Wd is the simulated light pattern; $\alpha$ is a constant; and $W_j$ is the convolution of a point spread function for the pixel of the first plurality of pixels with a Dirac delta function located at the pixel of the first plurality of pixels.

22. A system according to claim 17 wherein the initial control values generator is configured to generate the set of control values such that an intensity of the estimated light pattern at a pixel of the second plurality of pixels illuminated by the first plurality of pixels exceeds an intensity of a corresponding location of the desired image by an amount within a modulation range of the pixel of the second plurality of pixels.

* * * * *

UNITED STATES PATENT AND TRADEMARK OFFICE
CERTIFICATE OF CORRECTION

PATENT NO. : 8,531,353 B2
APPLICATION NO. : 12/524687
DATED : September 10, 2013
INVENTOR(S) : Heidrich et al.

It is certified that error appears in the above-identified patent and that said Letters Patent is hereby corrected as shown below:

In the Specification

Column 5, line 56, the "." after the word pixel is deleted so that the sentence beginning at column 5, line 54 and ending at column 5, line 59 is corrected to --This can be done because, in typical dual modulator displays, a pixel 12A of first array 12 does not contribute much light at pixels 14A of second array 14 that are at coordinates distant from the pixel 12A.--

Column 9, line 10, the portion of Equation 7 reading "d.sub.j," is corrected to --d.sub.j S.sub.j,--; Equation 7 is corrected to read as follows:

$$\sum_{x,y} \left( \bar{I}_{(x,y)} - \Delta d_j S_{j(x,y)} - \alpha B^j_{(x,y)} \right)^2 M_{j,(x,y)} F_{(x,y)} = 0$$

Column 9, line 30, "The value of a may be set to adjust the displayed image." is corrected to --The value of α may be set to adjust the displayed image.--

Column 9, line 35, "resulting 'in p.sub.avg = 0.5." is corrected to --resulting in p.sub.avg = 0.5.--

Column 9, line 41, "a depending on the local neighbourhood" is corrected to --α depending on the local neighbourhood--

Signed and Sealed this
Eleventh Day of February, 2014

Michelle K. Lee
*Deputy Director of the United States Patent and Trademark Office*